United States Patent
Baklanov

(10) Patent No.: US 9,378,665 B2
(45) Date of Patent: Jun. 28, 2016

(54) TACTILE RELIEF FILMS, DECALS AND STICKERS FOR INDICATING OBJECT CHARACTERISTICS

(71) Applicant: Dmitry Baklanov, Norilsk (RU)

(72) Inventor: Dmitry Baklanov, Norilsk (RU)

(73) Assignee: OAK Novations, Ltd., Middlesex, NJ (US)

( * ) Notice: Subject to any disclaimer, the term of this patent is extended or adjusted under 35 U.S.C. 154(b) by 0 days.

(21) Appl. No.: 14/198,577

(22) Filed: Mar. 5, 2014

(65) Prior Publication Data

US 2014/0182770 A1 Jul. 3, 2014

Related U.S. Application Data

(62) Division of application No. 13/310,725, filed on Dec. 3, 2011, now Pat. No. 8,672,680.

(51) Int. Cl.
*G09F 3/10* (2006.01)
*G09B 21/00* (2006.01)
*G09F 3/02* (2006.01)

(52) U.S. Cl.
CPC .. *G09F 3/10* (2013.01); *G09F 3/02* (2013.01); *G09B 21/003* (2013.01); *G09F 2003/023* (2013.01); *G09F 2003/0276* (2013.01); *Y10T 156/10* (2015.01); *Y10T 428/1476* (2015.01); *Y10T 428/24355* (2015.01)

(58) Field of Classification Search
CPC .................. G09B 21/003; G09F 2003/023
USPC ................ 434/98, 113; 273/DIG. 24, 282.2
See application file for complete search history.

(56) References Cited

U.S. PATENT DOCUMENTS

| | | | | |
|---|---|---|---|---|
| 3,726,027 A | * | 4/1973 | Cohen et al. | 434/98 |
| 4,650,421 A | * | 3/1987 | Anczurowski | 434/113 |
| 5,286,204 A | * | 2/1994 | Minardi | 434/113 |
| 7,217,132 B2 | * | 5/2007 | Knepper | 434/159 |
| 2008/0113578 A1 | * | 5/2008 | McAlaine et al. | 446/75 |

FOREIGN PATENT DOCUMENTS

GB 2263269 A * 7/1993

* cited by examiner

*Primary Examiner* — Benjamin Layno
(74) *Attorney, Agent, or Firm* — Cygnet IP Law, P.A.; Stephen W. Aycock, II

(57) ABSTRACT

A system and method of making and using tactile relief stickers, decals or moldings to indicate object characteristics, for example to indicate object color. The system can include a plurality of stickers. Each sticker can have a first surface with a relief texture and a second surface opposite the first surface. Each sticker can also have a relief texture corresponding to an object characteristic selected from the group consisting of weight, type of the end of the object, and object hardness. The second surface can have an adhesive applied thereto.

16 Claims, 3 Drawing Sheets

TACTILE RELIEF FILMS, DECALS AND STICKERS FOR INDICATING OBJECT CHARACTERISTICS

This application is a divisional of U.S. application Ser. No. 13/310,725, filed on Dec. 3, 2011.

Embodiments relate generally to devices for vision impaired persons, and, more particularly to a film and decal having a tactile relief surface to indicate an object characteristic such as color.

At least one embodiment can include a tactile relief film or decal made from rubber or plastic, for purposes of creating raised markings for reading and recognition by the visually impaired. The film or decals can be formed from a transparent material such that the color of the underlying object that the film or decal is applied to is visible to a person who can see color. The film/decal may be applied during production at the manufacturing phase or may be applied post-production.

At least one embodiment can make it possible for a user to determine colors of objects and their parts, component elements, or the like by feel or touch through use of tactile recognition (similar to the way Braille markings are used). Tactile relief films or decals indicating colors in accordance with at least one embodiment can be applied to objects such as toys and pencils, for example. One or more embodiments can include abbreviated versions of words or descriptions that may be utilized to reduce response time and increase perception. Also, the tactile reliefs can resemble known objects or patterns, and thereby assist with the identification of the symbol or color. For example, the tactile relief may resemble the surface of an orange for identification of the color orange.

At least one embodiment can include a film/decal having a relief that can be easily identifiable and familiar, in terms of use in this particular application.

Also, in at least one embodiment, a tactile relief for indicating color in accordance with the present disclosure can be molded, stamped or formed directly on a surface of an object. Alternatively, an embodiment can be applied to a surface as an adhesive film, decal or sticker.

An embodiment can permit more rapid recognition of identifiers such as color than is offered by traditional methods that require the reading of a word to identify the trait or characteristic (e.g., Braille). In this respect, an embodiment can facilitate increased socialization and integration. Also, by providing a more easily learned and/or recognized tactile relief surface, an embodiment can be used by persons having color blindness as their only uncorrectable vision impairment. Thus, a color blind person, who has no need to learn the Braille system, can learn the disclosed color indicating tactile relief system, which can be limited to indicating colors or other characteristics.

The relief elements are preferably of sufficient height to permit tactile recognition by either a vision impaired person or a person without vision impairment other than colorblindness, while not interfering with proper functioning of an object. Decals, film or sticker can be made from a transparent, non-rigid, durable material such as rubber or some plastics.

At least one embodiment can include a relief texture-to-color mapping system such as, for example, the following:

| Color | Relief Texture |
| --- | --- |
| White | Smooth, polished surface (could have other raised texture such as lines, symbols, or combination of the above) |
| Red | Small asterisks |
| Orange | Similar to orange peel |
| Yellow | Circular indentions |
| Green | Similar to cucumber skin |
| Blue | Wavy lines (the spacing of the lines could be used to indicate hue) |
| Violet | Waves with interspersed asterisks |
| Brown | Brickwork-like pattern |
| Black | Lattice texture |

At least one embodiment can be used for the designation of the texture of cloth, clothing, wall-papers, relief of furniture, dishes or the like. For example, an embodiment can contain information regarding the surface of an object, its form, shape, texture, or the like. For persons with unimpaired vision, the tactile relief surface, film or decals can be used to identify objects or characteristics of objects where illumination is not available or where visual utility is limited. An embodiment can also include a phosphorescent or "glow in the dark" material integrated into the sticker or decal material or applied as a coating to stickers or decals.

DETAILED DESCRIPTION

Figure 1:
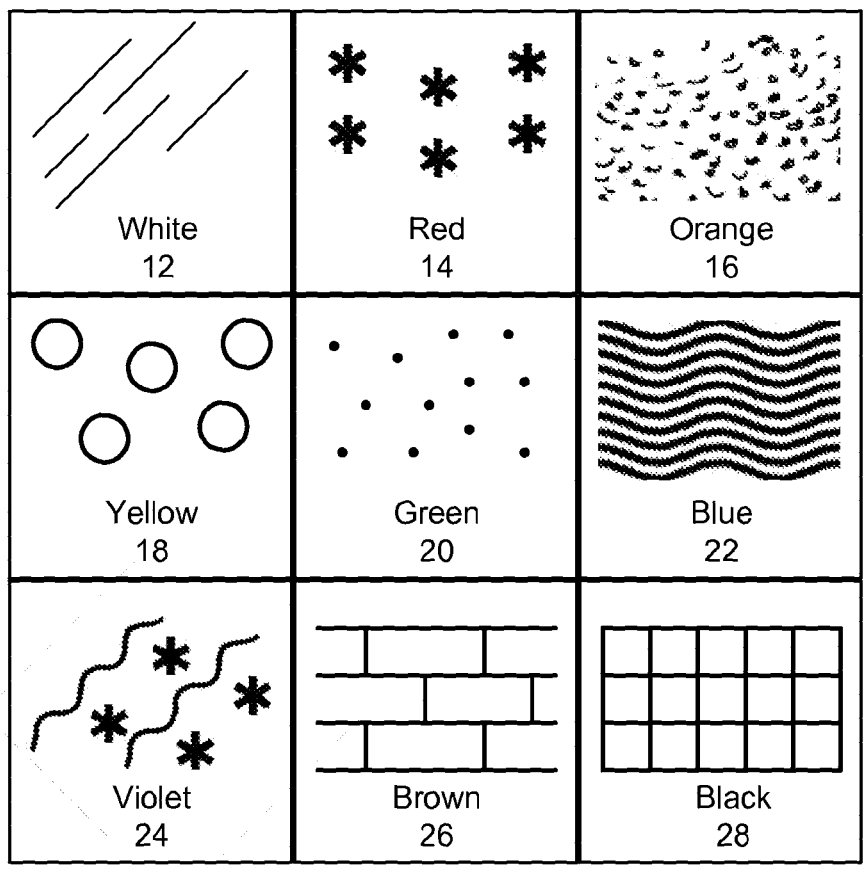
FIG. 1 is diagram of exemplary tactile relief stickers for indicating color in accordance with at least one embodiment.

FIG. 1 is a diagram of an exemplary set of tactile relief stickers 10 for indicating color of an object. The set 10 includes stickers for indicating the following colors: white (12), red (14), orange (16), yellow (18), green (20), blue (22), violet (24), brown (26) and black (28).

The tactile relief surface texture can correspond to the colors according to the following table:

| Color | Relief Texture |
| --- | --- |
| White | Smooth, polished surface (could have other raised texture such as lines, symbols, or combination of the above) |
| Red | Small asterisks |
| Orange | Similar to orange peel |
| Yellow | Circular indentions |
| Green | Similar to cucumber skin |
| Blue | Wavy lines (the spacing of the lines could be used to indicate hue) |
| Violet | Waves with interspersed asterisks |
| Brown | Brickwork-like pattern |
| Black | Lattice texture |

In use, the stickers can be applied to objects to permit a person having a visual impairment (e.g., full or partial sight, color blindness, or the like) to use tactile sensation to determine the color of an object.

In addition or as an alternative to indicating colors, the stickers can be used to indicate other characteristics of an object such as weight (e.g., heavy or light), type of surface (e.g., smooth or rough), type of the end of the object (e.g., sharp or dull), type of its hardness (e.g., hard or fragile) or the like.

Figure 2:
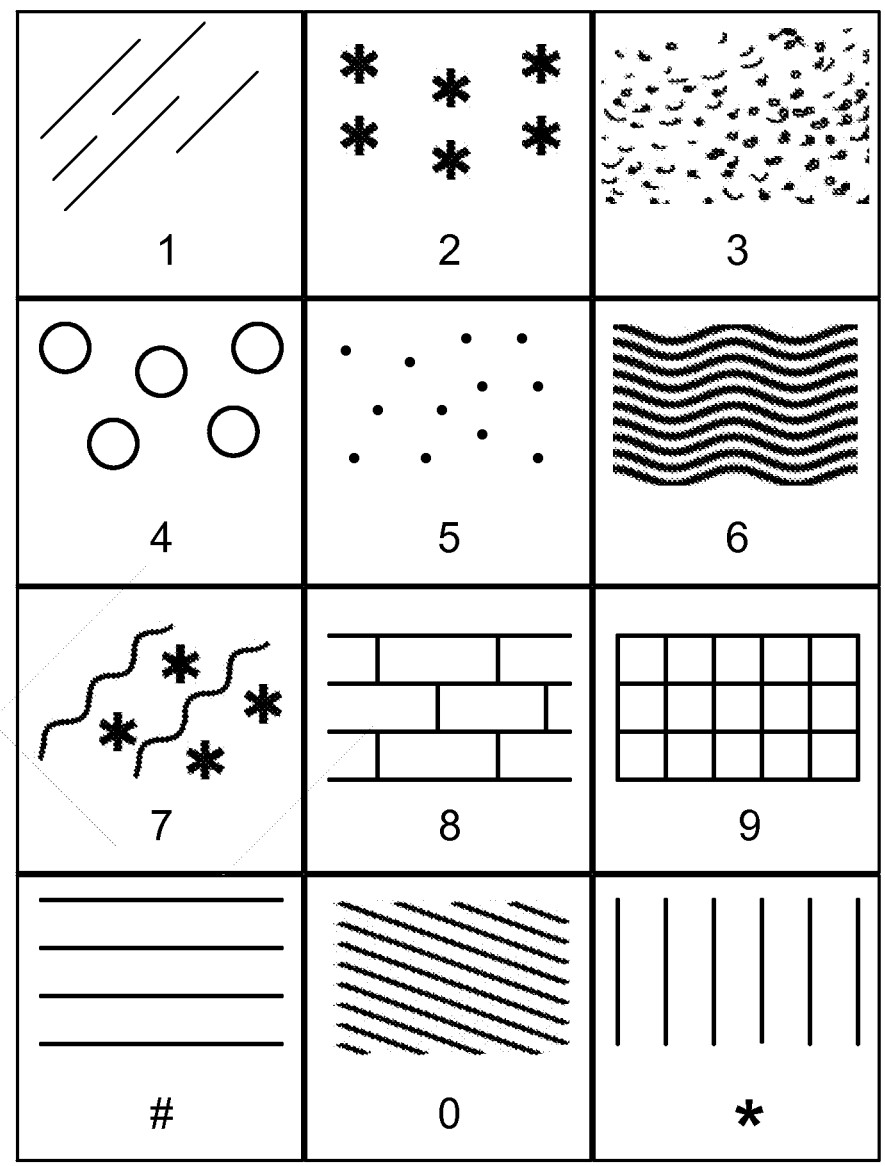
FIG. 2 is a diagram of an exemplary telephone keypad having tactile relief moldings for indicating button number in accordance with at least one embodiment.

FIG. 2 is a diagram of an exemplary telephone keypad 30 having tactile relief textures in accordance with at least one embodiment molded into the buttons of the telephone keypad 30.

In operation, a person with impaired vision or a person in low visibility can use tactile senses to determine which buttons are which on the keypad. It will be appreciated that other types of keypads can be used such as computer keypads, or the like. Also, it will be appreciated that the relief moldings or stickers could be placed on any type of keypad or button for controlling and electrical and/or mechanical device.

Figure 3A:
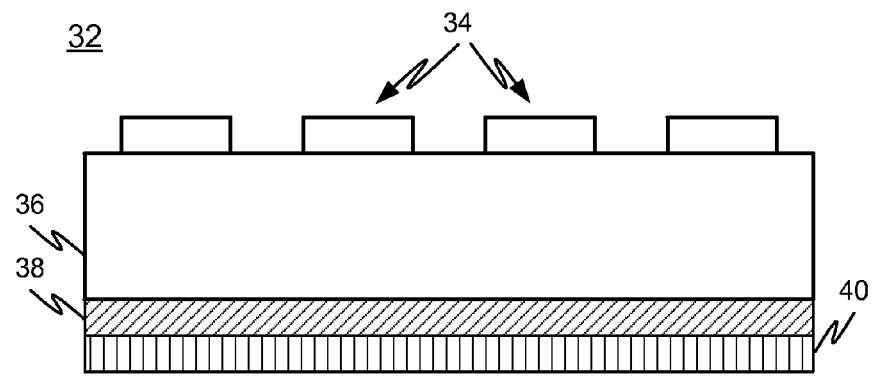
FIGS. 3A and 3B are cross sectional diagrams of an exemplary tactile relief sticker or decal in accordance with at least one embodiment.
Figure 3B:
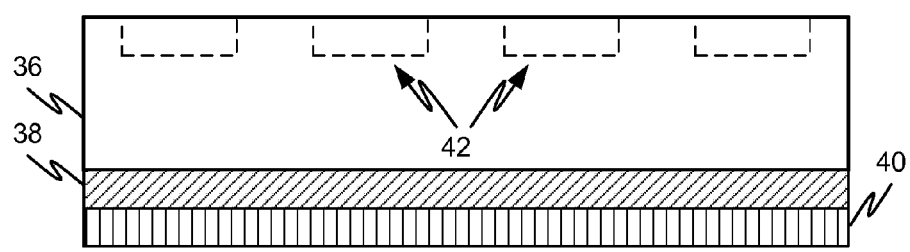

FIGS. 3A and 3B are cross sectional diagrams of exemplary stickers in accordance with at least one embodiment.

FIG. 3A shows an embodiment having a positive tactile relief texture (i.e., a raised texture). The sticker 32 includes a tactile relief texture 34, a sticker body portion 36 an adhesive layer 38 and a removable backing layer 40.

FIG. 3B is similar to FIG. 3A, except that the tactile relief texture 42 of FIG. 3B is recessed into the sticker body portion 36 to create a negative tactile relief texture.

The stickers can also be impregnated, treated or coated with a phosphorescent or glowing material so that the location of the sticker (or film or decal) can be visible in low light.

In addition to the exemplary applications discussed above, tactile relief stickers, decals or moldings in accordance with at least one embodiment could be used on TV (or other electronic device) remote control buttons. An embodiment could also be used on games that rely on color, such as the Rubik's cube, to enable a person with a vision impairment (e.g., full or partial blindness or full or partial color blindness) to play the game.

It is, therefore, apparent that there is provided, in accordance with the various embodiments disclosed herein, tactile relief surfaces, films and decals for tactile indication of color or other object characteristics, traits or features.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A method of manufacturing tactile relief indicators, the method comprising:
   forming a plurality of stickers, each sticker having a first surface with a relief texture and a second surface opposite the first surface,
   wherein each sticker is formed to include a non-Braille relief texture indicating an object characteristic via tactile sensation according to a predetermined correspondence of one texture to one object characteristic, wherein the object characteristic includes a tactile sensation indication of one of sharp, dull, and fragile, and wherein each sticker is configured to permit rapid recognition of an object characteristic identifier without requiring a user to learn Braille, and
   wherein the second surface has an adhesive applied thereto.

2. The method of claim 1, wherein the plurality of stickers are formed of a translucent material.

3. The method of claim 1, wherein the plurality of stickers is disposed on a single sheet of backing material applied to the adhesive such that the stickers are removable from the backing material and retain adhesive properties after removal from the backing material.

4. The method of claim 1, wherein the stickers further comprise a material having phosphorescent properties.

5. The method of claim 1, wherein the adhesive is a reusable adhesive.

6. The method of claim 1, wherein the tactile relief textures are formed to stimulate an association with known objects.

7. The method of claim 1, wherein the tactile relief textures are raised textures.

8. The method of claim 1, wherein the tactile relief textures are recessed textures.

9. A sticker for indicating characteristics of objects, the sticker having a first side with a non-Braille tactile relief texture and a second side with an adhesive material applied thereto,
   wherein the sticker is formed from a flexible material and the non-Braille tactile relief texture indicates a corresponding object characteristic via tactile sensation according to a predetermined correspondence of one texture to one object characteristic, and
   wherein the object characteristic includes a tactile sensation indication of one of sharp, dull, and fragile, and wherein each sticker is configured to permit rapid recognition of an object characteristic identifier without requiring a user to learn Braille.

10. The sticker of claim 9, wherein the sticker is formed from a translucent material.

11. The sticker of claim 9, wherein the tactile relief texture is a raised texture.

12. The system of claim 9, wherein the tactile relief texture is a recessed texture.

13. A method of utilization of tactile sensations to stimulate an association with a known object to identify a particular trait of an unknown object, the method comprising:
   applying a tactile relief sticker to a first object, the tactile relief sticker having a first side with a non-Braille tactile relief texture and a second side with an adhesive material applied thereto, and being formed from a flexible material; and
   providing one or more non-Braille tactile relief textures each indicating a specific object trait,
   wherein the tactile relief sticker includes a tactile relief texture indicating a tactile sensation of a trait of the object to which the tactile relief sticker is applied to, and
   wherein the trait includes a tactile sensation indication of one of sharp, dull, and fragile, and wherein each sticker is configured to permit rapid recognition of an object characteristic identifier without requiring a user to learn Braille.

14. The method of claim 13, further comprising stimulating an association between a known object and the object to which the tactile relief sticker is applied by tactile sensation.

15. The method of claim 13, further comprising making the tactile relief sticker visible in low light by providing a phosphorescent material on the tactile relief sticker.

16. The method of claim 13, wherein the tactile relief sticker is formed from a translucent material.

* * * * *